(12) United States Patent
Jeong et al.

(10) Patent No.: US 7,703,304 B2
(45) Date of Patent: Apr. 27, 2010

(54) APPARATUS FOR QUANTITATIVE SOLIDIFICATION OF MOLTEN SALT BY USING VACUUM TRANSFER AND DUAL VESSEL

(75) Inventors: Myeong Soo Jeong, Seo-gu (KR); Jin Mok Hur, Yuseong-gu (KR); Soo Haeng Cho, Joong-gu (KR); Chung Seok Seo, Yuseong-gu (KR); Seong Won Park, Yuseong-gu (KR)

(73) Assignees: Korea Atomic Energy Research Institute (KR); Korea Hydro & Nuclear Power Co., Ltd. (KR)

( * ) Notice: Subject to any disclaimer, the term of this patent is extended or adjusted under 35 U.S.C. 154(b) by 1309 days.

(21) Appl. No.: 11/189,657

(22) Filed: Jul. 26, 2005

(65) Prior Publication Data

US 2006/0179883 A1 Aug. 17, 2006

(30) Foreign Application Priority Data

Feb. 3, 2005 (KR) .................. 10-2005-0010050

(51) Int. Cl.
C03B 7/00 (2006.01)
C03B 5/00 (2006.01)
B22D 35/06 (2006.01)

(52) U.S. Cl. .................. 65/329; 65/347; 222/593

(58) Field of Classification Search .................. 65/329, 65/347; 222/596
See application file for complete search history.

(56) References Cited

U.S. PATENT DOCUMENTS

| 4,527,717 | A | * | 7/1985 | Emoto et al. ................. 222/593 |
| 4,566,525 | A | * | 1/1986 | Li et al. ....................... 164/463 |
| 5,030,482 | A | * | 7/1991 | Tadayon ....................... 427/244 |
| 5,914,440 | A | * | 6/1999 | Celik et al. ................... 75/407 |
| 6,799,595 | B1 | * | 10/2004 | Salan et al. ................... 137/13 |

FOREIGN PATENT DOCUMENTS

| WO | WO 98/15374 A1 | 4/1998 |
| WO | WO 98/20995 A2 | 5/1998 |

* cited by examiner

*Primary Examiner*—Steven P Griffin
*Assistant Examiner*—Russell J Kemmerle, III
(74) *Attorney, Agent, or Firm*—The Webb Law Firm

(57) ABSTRACT

Provided are an apparatus and method for manufacturing a solidified salt that is easy to treat in size and shape by using a vacuum transfer and a dual vessel. In the apparatus for quantitative solidification of a molten salt, a molten salt is introduced into a first vessel, and a second vessel is disposed inside the first vessel and quantitatively supplied with the molten salt. A molten-salt transferring unit quantitatively transfers the molten salt from the first vessel to the second vessel by vacuum pressure. A valve controls a discharge of the molten salt from the second vessel. A mold receives the molten salt from the second vessel and solidifies the molten salt. Accordingly, the molten salt can be stably discharged to the mold by quantitatively transferring the molten salt at vacuum pressure within the dual vessel, and a predetermined size and shape of the solidified salt can be manufactured, thereby processing and collecting the solidified salt safely.

8 Claims, 4 Drawing Sheets

APPARATUS FOR QUANTITATIVE SOLIDIFICATION OF MOLTEN SALT BY USING VACUUM TRANSFER AND DUAL VESSEL

RELATED APPLICATION

The present application is based on, and claims priority from, Korean Application Number 2005-10050, filed Feb. 3, 2005, the disclosure of which is hereby incorporated by reference herein in its entirety.

BACKGROUND OF THE INVENTION

1. Field of the Invention

The present invention relates to an apparatus and method for manufacturing a solidified salt that is easy to treat in size and shape by using a vacuum transfer and a dual vessel, and more particularly, to an apparatus and method for quantitative solidification of a molten salt by using a vacuum transfer and a dual vessel, in which a molten salt is stably discharged to a mold by quantitatively transferring the molten salt at a vacuum pressure within the dual vessel, and a predetermined size and shape of a solidified salt is manufactured, thereby processing and collecting the solidified salt safely.

2. Description of the Related Art

A molten salt has been widely applied in a variety of industrial technologies because of its inherent physical and chemical properties, that is, high electrical conduction, material transfer, and fluid properties. In recent years, the molten salt is actively used in many technical fields, including metal manufacture and purification, fuel cell, and so on.

In a process using a molten salt as a reaction medium, a sequential operation is impossible because a salt is solidified at a temperature below a melting point. Accordingly, a batch reactor is used for stepwise operations.

Due to deliquescence of salt, the process of molten salt requires operating conditions of inert atmosphere. Accordingly, it is difficult to transfer the molten salt out of the reactor for the purpose of purifying or recycling the salt or reusing the salt in a subsequent process.

Specifically, a large amount of the molten salt is used as a reaction medium in a metal manufacture and purification. After finishing the process, a large volume of the molten salt needs to be discharged out of the vessel and divided and solidified into a proper size and shape of a salt in order to easily process the molten salt in a subsequent process.

However, salt mass solidified in a discharge passage must be dissolved in order to re-discharge the molten salt out of the vessel after its discharge is paused.

As one example, the solidified salt can be dissolved using an $O_2$ lance. However, this method is very dangerous and cannot be applied when an access to an apparatus is not easy. In order to solve this problem, PCT Application No. PCT/EP97/05469 discloses a method of melting the solidified melt by supplying an electromagnetic energy at a side of a discharge passage.

If such a conventional method is applied to a quantitative discharge of a molten salt, a salt mass is easily molten, but a molten salt cannot be quantitatively discharged. In addition, the molten salt cannot be rapidly discharged due to a melting time of the salt mass. Meanwhile, a mold is inevitably used to solidify the molten salt in a predetermined size and shape.

When the solidified material is attached to the mold, it is difficult to separate the solidified material from the mold. A method for solving this problem is disclosed in PCT Application No. PCT/EP97/06197; in which a mold containing a molten salt can be quickly cooled by immersing the mold in a low-temperature liquid. However, the mold must be vertically dropped down from an outside of a heater in order for the cooling. Also, it is difficult to prevent heat loss of the heater.

The conventional apparatus and method for discharging the molten salt cannot quantitatively solidify the molten salt in a size and shape easy to treat. Accordingly, there is a demand for an apparatus and method that can quantitatively discharge the molten salt and rapidly solidify it in a proper size and shape.

SUMMARY OF THE INVENTION

Accordingly, the present invention is directed to an apparatus and method for quantitative solidification of a molten salt that substantially obviates one or more problems due to limitations and disadvantages of the related art.

An object of the present invention is to provide an apparatus and method for quantitative solidification of a molten salt by using a vacuum transfer and a dual vessel. In the apparatus, when the molten salt is discharged out of the reactor for the purpose of purifying or recycling a high-temperature molten salt or reusing the molten salt in a subsequent process, the molten salt can be rapidly solidified in a proper size and shape, thereby processing and collecting the solidified salt safely.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an apparatus for quantitative solidification of a molten salt includes: a first vessel into which the molten salt is introduced; a second vessel disposed inside the first vessel and quantitatively supplied with the molten salt; a molten-salt transferring unit for quantitatively transferring the molten salt from the first vessel to the second vessel by vacuum pressure; a valve for controlling a discharge of the molten salt from the second vessel; and a mold for receiving the molten salt from the second vessel and solidifying the molten salt.

The first vessel, the second vessel and the valve are capable of heating the molten salt to above a melting point by a first heater, a second heater and a mold heater.

The valve includes a nozzle for discharging the molten salt from the second vessel and a stopper for opening/closing the nozzle. In order to prevent salt mass from being formed in the nozzle during the discharge of the molten salt, a nozzle heater that can heat the nozzle to a temperature above the melting point of the molten salt is installed in an outside of the nozzle.

In addition, the mold in which the solidified salt is manufactured is maintained at a temperature below a melting point of the molten salt.

According to another aspect of the present invention, a method for quantitative solidification of a molten salt includes the steps of: melting a salt into a molten salt within a first vessel; transferring the molten salt from the first vessel to a second vessel by using vacuum pressure; and discharging a predetermined amount of the molten salt from the second vessel through a nozzle to a mold, and cooling the molten salt in the mold to manufacture a solidified salt of a predetermined size and shape.

During the process operation, the salt is maintained in a molten state by maintaining a temperature of the first vessel at a temperature above the melting point of the salt.

The molten salt is processed in inert gas (Ar) atmosphere, such that deliquescence of salt due to external air is prevented.

Although there is no special limit to the salt that is treated during the process of quantitatively solidifying the molten salt, the melting point of the salt must be considered. For example, when a molten salt of lithium chloride is treated, the heaters must maintain temperatures of the first vessel, the second vessel and the nozzle to above 610° C., which is a melting point of the lithium chloride.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

The present invention provides an apparatus and method for quantitative solidification of a salt used in a precedent process, in which a molten salt is solidified in a proper size and shape easy to treat, such that the solidified salt can be suitably purified and reused or used in a subsequent process.

Accordingly, instead of a bulky molten salt with high temperature and strong corrosive property, a solidified salt with room temperature having a proper size and shape easy to treat can be introduced in a post-process.

Figure 1:
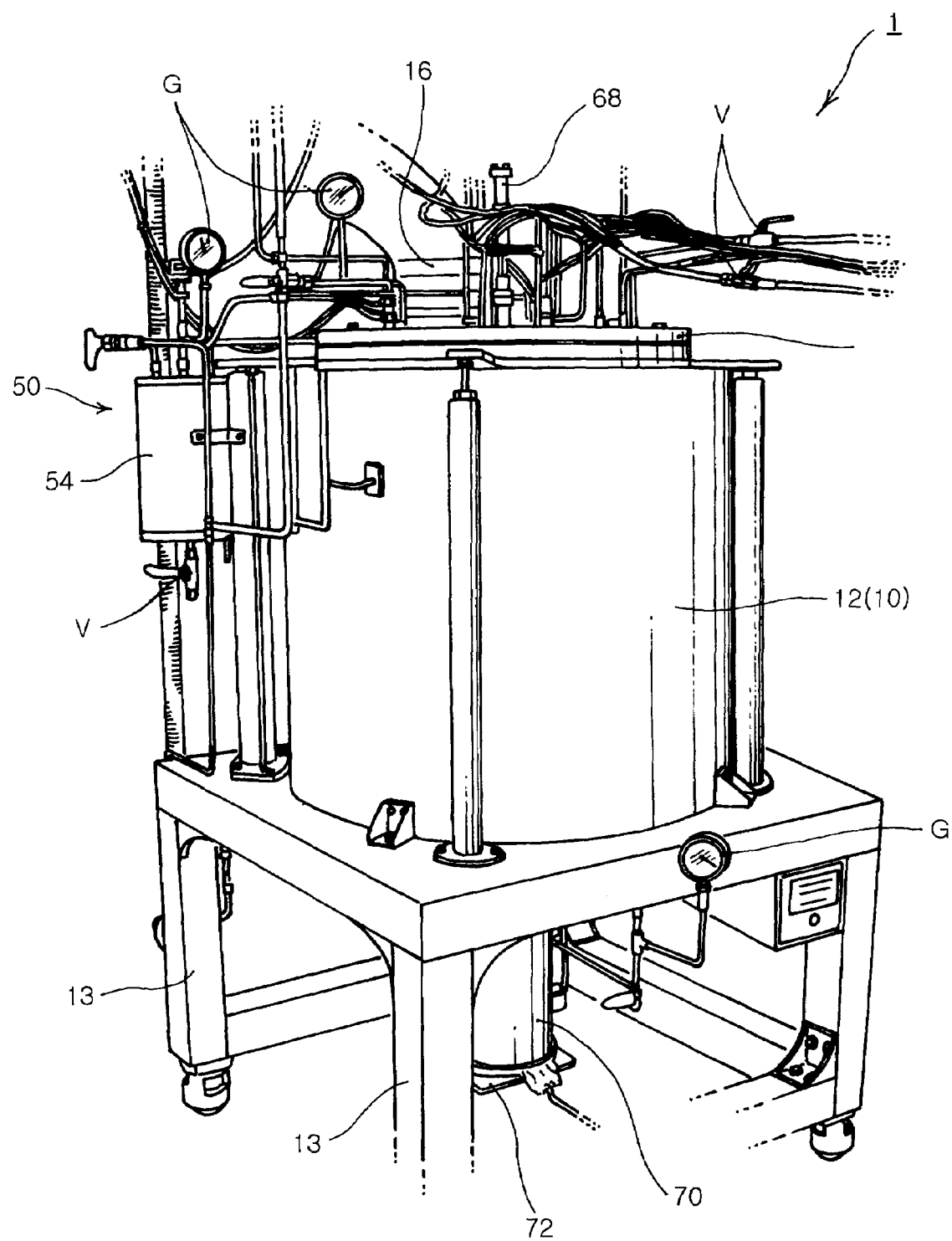
FIG. 1 is a perspective view of an apparatus for quantitative solidification of a molten salt according to the present invention.
Figure 2:
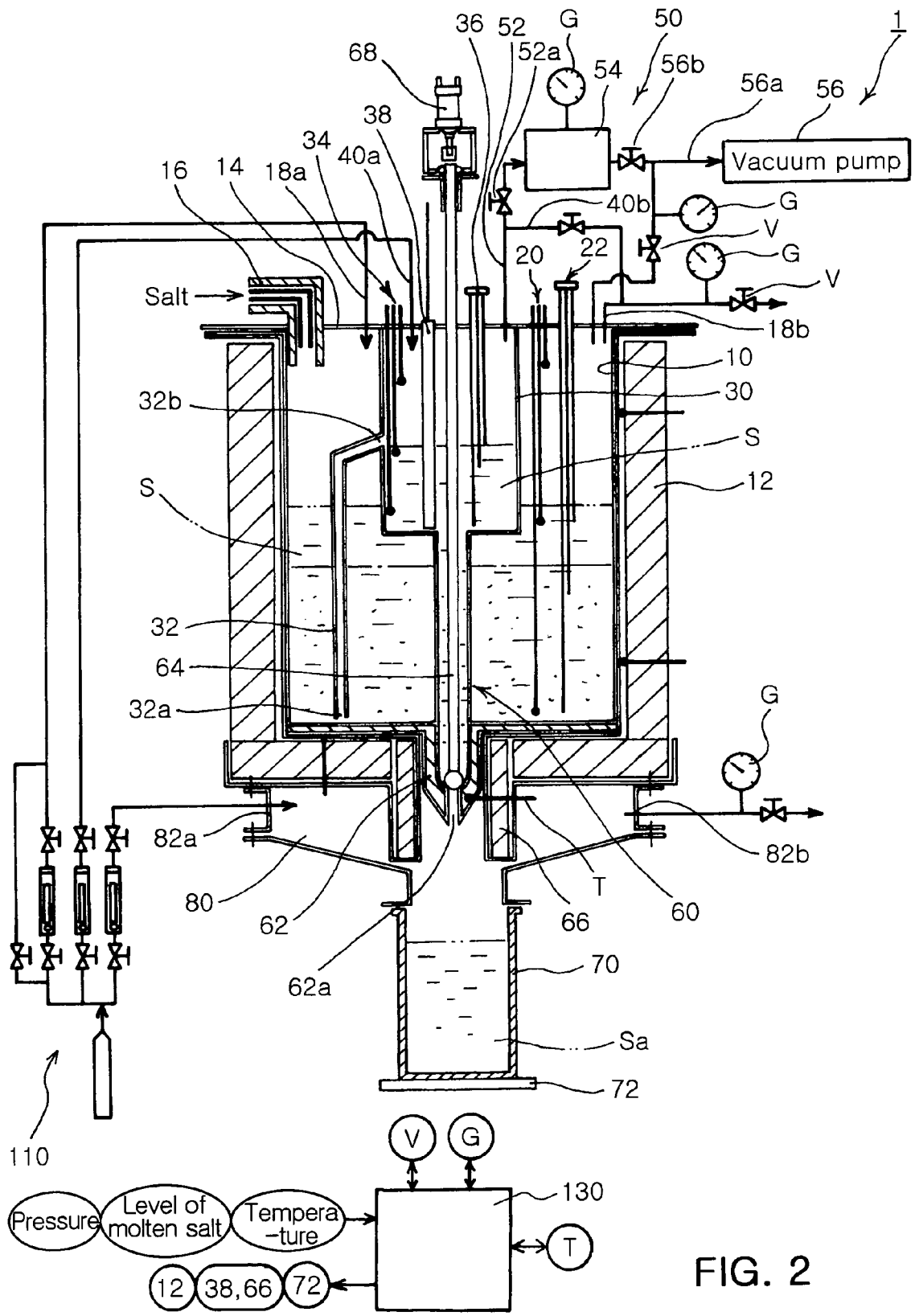
FIG. 2 is a longitudinal sectional view illustrating an inner structure of the apparatus for quantitative solidification of the molten salt according to the present invention.
Figure 3:
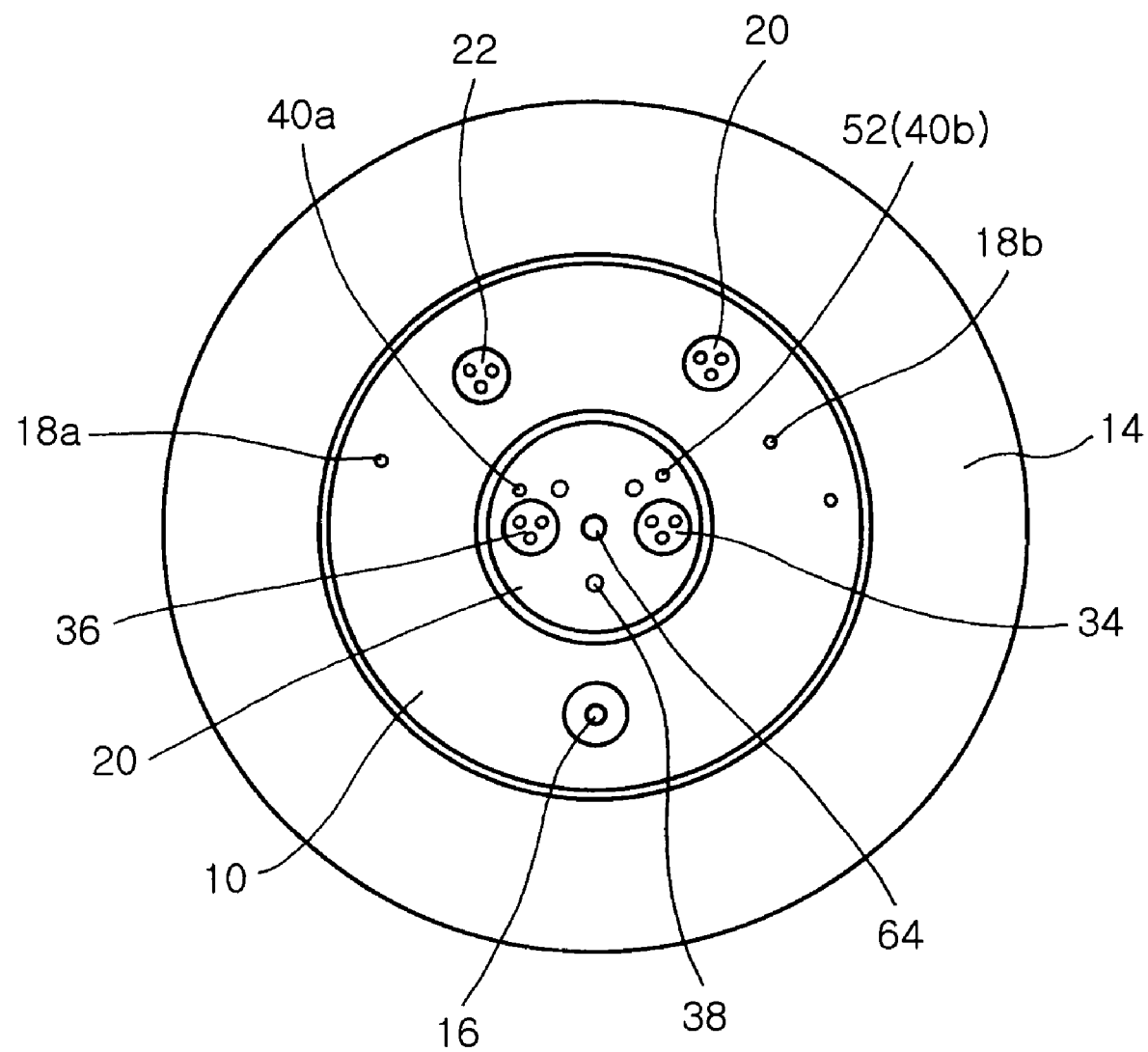
FIG. 3 is a plan view illustrating a cover of the apparatus for quantitative solidification of the molten salt according to the present invention.

An apparatus 1 for quantitative solidification of a molten salt according to the present invention is illustrated in FIGS. 1 and 2. The apparatus 1 includes a first vessel 10 into which a molten salt S is introduced. The first vessel 10 has a space where the molten salt S is contained. A first heater 12 is provided at a periphery of the first vessel 10. The first vessel 10 and the first heater 12 can be located on a base 13 of a predetermined size.

The first vessel 10 has a lid 14 on the top thereof and a salt inlet 16 is formed at a side of the lid 14. An inert gas inlet 18a is formed in one side of the lid 14 and an inert gas outlet 18b is formed in the other side of the lid 14. Also, the first vessel 10 includes a first thermocouple 20 for measuring an internal temperature of the first vessel 10, and a first level detector 22 for detecting a level of a molten salt within the first vessel 10.

The salt S is put into the first vessel 10 and is heated at a temperature above a melting point of the salt S by the first heater 12. An inert gas flows into the first vessel 10 and the salt S is heated in an inert gas atmosphere.

Since the interior of the first vessel 10 is maintained in the inert gas atmosphere, deliquescence of salt due to external air does not occur.

The apparatus 1 includes a second vessel 30 disposed inside the first vessel 10. The second vessel 30 is quantitatively supplied with the molten salt S.

Since the second vessel 30 is located at a middle upper portion inside the first vessel 10, a space where a molten salt S to be discharged to a mold 70 (which will be described later) is contained, is defined in the interior of the second vessel 30. A molten-salt transferring pipe 32 is elongated from one side of the second vessel 30 to the inner space of the first vessel 10.

A lower end 32a of the molten-salt transferring pipe 32 is arranged close to a bottom of the first vessel 10. Its aim is to transfer the molten salt S contained in the first vessel 10 to the second vessel 30.

Also, the second vessel 30 includes a second thermocouple 34 for measuring an internal temperature of the second vessel 30, and a second heater 38, and a second level detector 36 for detecting a level of a molten salt within the second vessel 30.

In addition to the first vessel 10, the second vessel 30 is covered by the lid 14. For tightly sealing both the first vessel 10 and the second vessel 30, the lid 14 has a sealing member (not shown) on regions contacting with the first and second vessels 10 and 30.

An inert gas inlet 40a is formed in one side of the lid 14 and an inert gas outlet 40b is formed in the other side of the lid 14. Therefore, the interior of the second vessel 30 is also maintained in inert gas atmosphere.

Also, the apparatus 1 includes a molten-salt transferring unit 50 for quantitatively transferring the molten salt S from the first vessel 10 to the second vessel 30 under vacuum pressure.

The molten-salt transferring unit 50 forms vacuum pressure within the second vessel 30 and transfers the molten salt S from the first vessel 10 to the second vessel 30. The lid 14 for the second vessel 30 is connected to a vacuum guide pipe 52. The vacuum guide pipe 52 is connected to a pressure surge tank 54, and one side of the pressure surge tank 54 is connected to a vacuum pump 56.

Accordingly, an operation of the vacuum pump 56 forms vacuum pressure in the interior of the pressure surge tank 54, causing the internal pressure of the second vessel 30 to be reduced through the vacuum guide pipe 52. Consequently, the molten salt S is transferred from the first vessel 10 to the second vessel 30 through the molten-salt transferring pipe 32.

Further, the apparatus 1 includes a valve 60 for controlling a discharge of the molten salt S from the second vessel 30. The valve 60 uses a nozzle 62 for discharging the molten salt S from the second vessel 30 and a stopper 64 for opening/closing the nozzle 62. In order to prevent salt mass from being formed in the nozzle 62 during the discharge of the molten salt, a nozzle heater 66 that can heat the nozzle 62 to a temperature above the melting point of the molten salt S is installed in an outside of the nozzle 62.

The nozzle 62 extends downward from the center of the bottom of the second vessel 30 to the center of the bottom of the first vessel 10, and a molten-salt outlet 62a is disposed below the nozzle 62. The stopper 64 for opening/closing the nozzle 62 extends coaxially in the nozzle 62 and a lower end of the stopper 64 opens/closes the molten-salt outlet 62a of the nozzle 62.

The stopper 64 ascends or descends by means of an actuator 68 disposed at an upper portion thereof, to thereby open/close the nozzle 62. The actuator 68 may be a pneumatic cylinder.

Also, the apparatus 1 includes a mold 70 disposed below the nozzle 62. The mold 70 receives the molten salt S from the second vessel 30 and solidifies it. The molten salt S is collected as a solidified salt Sa.

For the shielding from the external air, a sealing chamber 80 seals a space between the mold 70 and the nozzle 62. The sealing chamber 80 is fixed to the lower portion of the first heater 12 such that it surrounds the nozzle 62, and the sealing chamber 80 is connected to an upper portion of the mold 70 in a sealing state.

The inert gas inlet 82a is formed in one side of the sealing chamber 80 and the inert gas outlet 82b is formed in the other side thereof, such that the interior of the sealing chamber 80 is maintained in inert gas atmosphere. Accordingly, the molten salt S can be introduced from the nozzle 62 to the mold without contacting with air.

Meanwhile, a mold heater 72 is disposed below the mold 70 and maintains a constant temperature of the mold 70. The mold heater 72 prevents a rapid temperature drop of the molten salt S contained in the mold 70. That is, the mold heater 72 allows the molten salt S to be solidified while cooling it slowly.

The heaters 66, 12, 38 and 72 can be configured with, but is not limited to, an electric resistance heater. That is, various types of a heater can be employed. The heaters can allow a smooth discharge of the molten salt, while maintaining a temperature above the melting point of the molten salt.

Figure 4:
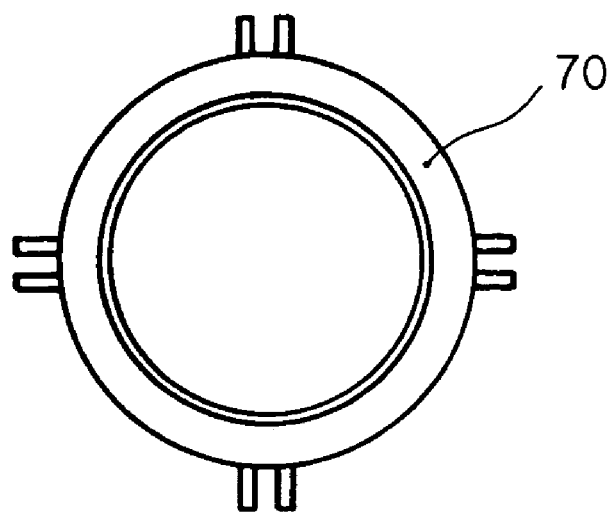
FIG. 4 is a plan view illustrating a mold of the apparatus for quantitative solidification of the molten salt according to the present invention.
Figure 5:
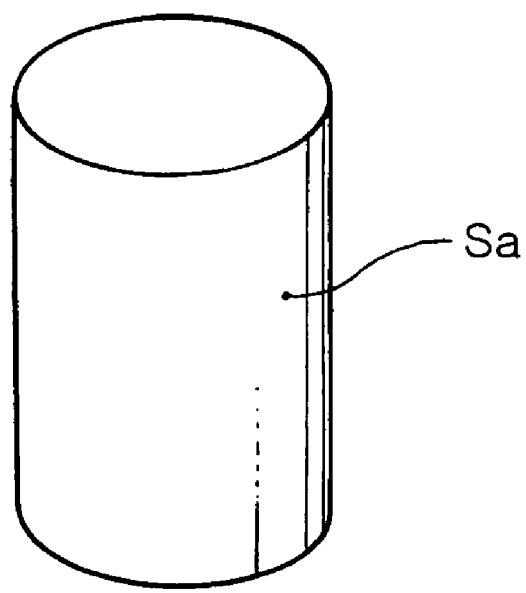
FIG. 5 is a perspective view of a solidified salt obtained by the apparatus for quantitative solidification of the molten salt according to the present invention.

The mold 70 can have a cylindrical inner space as shown in FIG. 4 and thus form a cylindrical solidified salt Sa as shown in FIG. 5. However, the present invention is not limited to this structure. For example, the mold 70 can have various shapes of sections and thus form various shapes of the solidified salt Sa.

In FIG. 2, a reference numeral 110 represents an inert gas supply system, and reference symbols V, G and T represent various kinds of valves, various pressure gauges, and thermometers, respectively. An automatic controller 130 can be a programmable logic controller or a microcomputer. The automatic controller 130 receives information on level of the molten salt, temperature and pressure and automatically or manually controls the valves, the heaters, and the actuators according to a predetermined process.

A method for quantitative solidification of a molten salt according to the present invention includes a process of melting a salt into a molten salt S within the first vessel 10. The first heater 12 disposed around the first vessel 10 heats the molten salt S to a temperature above its melting point within the first vessel 10. The melting point of the salt is above at least 400° C.

In a subsequent process, the molten salt S contained in the first vessel 10 is transferred to the second vessel 30 by using vacuum pressure.

The salt S that is heated and molten within the first vessel 10 is quantitatively transferred to the second vessel 30 by means of the transferring unit 50 as much as the salt S is discharged through the transferring pipe 32 to the mold 70.

That is, after the pressure surge tank 54 is vacuumized by the vacuum pump 56, if the vacuum guide pipe 52 connecting the second vessel 30 and the pressure surge tank 54 is opened, the molten salt S as much as the volume of the pressure surge tank 54 is transferred from the first vessel 10 through the transferring pipe 32 to the second vessel 30, resulting in pressure equilibrium.

In more detail, in FIG. 1, a second valve 56b of a pipe 56a connecting the pressure surge tank 54 and the vacuum pump 56 is opened and the vacuum pump 56 is driven to vacuumize the pressure surge tank 54. At this time, it is preferable that degree of vacuum is below $10^{-2}$ torr.

After the second valve 56b of the pressure surge tank 54 is closed, if a first valve 52a of the pressure surge tank 54 is opened, the molten salt S of the first vessel 10 that is in atmospheric pressure is transferred to the second vessel 30 that is in lower pressure than the first vessel 10. At this time, the molten salt S is transferred as much as the volume of the pressure surge tank 54. Consequently, both the first vessel 10 and the second vessel 30 are at the atmospheric pressure.

As illustrated in FIG. 1, since the molten-salt transferring pipe's entrance 32a directed to the first vessel 10 is disposed close to the bottom of the first vessel 10, most of the molten salt S contained in the first vessel 10 can be transferred to the second vessel 30. Also, the molten-salt transferring pipe's entrance 32b directed to the second vessel 30 is disposed at a higher position than the height of the molten salt S contained in the second vessel 30, thereby preventing the molten salt from reversely flowing from the second vessel 30 to the first vessel 10.

Also, the molten-salt transferring pipe's entrance 32b directed to the second vessel 30 is always disposed at a higher position than the height of the molten salt contained in the first vessel 10. A pressure P required to transfer the molten salt S from the first vessel 10 to the second vessel 30 through the height difference is given as Equation 1 below.

$$P = \rho g h \quad \text{(Equation 1)}$$

where $\rho$ is the density of the molten salt S, g is the gravitational acceleration, h is the height difference between the molten-salt transferring pipe's entrance 32b directed to the second vessel 30 and the molten salt S contained in the first vessel 10, and P is the pressure difference required to transfer the molten salt.

When the pressure difference between the second vessel 30 and the first vessel 10 due to the connection with the pressure surge tank 54 is larger than the pressure obtained from Equation 1 above, the molten salt S is transferred from the first vessel 10 to the second vessel 30.

For example, if the height difference h is 1 m, 1.5 g/cm³ 650° C. lithium chloride can be transferred from the first vessel 10 to the second vessel 30 when the pressure difference between the first vessel 10 and the second vessel 30 is more than about 0.15 atm.

By controlling the internal pressure of the pressure surge tank 54, an amount of the molten salt S transferred to the second vessel 30 and finally discharged to the mold 70 can be adjusted. The amount of the molten salt S transferred from the first vessel 10 to the second vessel 30 is given as Equation 2 below.

$$V_1/V_2 = (P_1 - P_2)/\text{atm} \quad \text{(Equation 2)}$$

where $V_1$ is the volume of the molten salt S transferred to the second vessel 30, $V_2$ is the internal volume of the pressure surge tank 54, $P_1$ is the internal pressure of the first vessel 10 in unit of atm, and $P_2$ is the internal pressure of the pressure surge tank 54 in unit of atm.

For example, if $P_1=1$ and $P_2=0.1$, the molten salt transferred from the first vessel 10 to the second vessel 30 is 0.9 times the internal volume of the pressure surge tank 54. However, if $P_1=1$ and $P_2=0.5$, the molten salt transferred from the first vessel 10 to the second vessel 30 is merely 0.5 times the internal volume of the pressure surge tank 54.

A predetermined amount of the molten salt S transferred to the second vessel 30 is discharged through the nozzle 62 to the mold 70 and is then cooled to thereby manufacture a solidified salt Sa of a predetermined size and shape. In this process, as shown in FIG. 1, the molten salt S that is quantitatively transferred to the second vessel 30 is discharged through the nozzle 62, which is opened due to the ascent of the stopper 64, to the mold 70, which is maintained at a temperature lower than the melting point of the salt S. Consequently, the solidified salts Sa of the same size and shape are manufactured.

The mold 70 used for manufacturing the salt of the same size and shape can be made of any materials having corrosion resistance to the molten salt S and mechanical durability. Also, the temperature of the mold 70 must be maximally lower than the melting point of the salt S, so that the molten salt S can be rapidly solidified and the solidified salt Sa can be easily separated from the mold 70. However, the mold 70 is preheated to above a predetermined temperature so as to prevent the bounce of the molten salt S due to the contact of the molten salt S with the low-temperature mold 70.

For example, when a molten salt S of 650° C. LiCl is discharged, the mold 70 made of stainless steel is maintained at a temperature of 100-150° C. Accordingly, the bounce phenomenon caused by the contact of the high-temperature molten salt S with the low-temperature mold 70 can be prevented. Also, the molten salt S discharged to the mold 70 can be rapidly solidified because the heat of the molten salt S is quickly transferred to the low-temperature mold 70.

As shown in FIG. 1, the mold 70 is flange-connected to the sealing chamber 80 at the lower portion of the solidification apparatus 1. Accordingly, the mold 70 can be hermetically sealed from the outside when quantitatively transferring the molten salt from the first vessel 10 to the second vessel 30 by using the pressure surge tank 54.

Although the stopper 64 having the pneumatic actuator 68 at the upper portion is preferably used as the valve for opening/closing the nozzle 62, the present invention is not limited to this stopper 64. That is, other mechanical driving devices (e.g., a solenoid actuator) for opening/closing the nozzle 62 can also be used.

Meanwhile, since the molten salt S such as chloride and fluoride is very corrosive, the long-term iterative processes lead to the corrosion of the solidification apparatus. Specifically, the corrosion occurring at the nozzle 62 and the stopper 64 makes it impossible to reliably open/close the nozzle 62. According to the present invention, however, the molten salt S is quantitatively transferred from the first vessel 10 to the second vessel 30 as much as the salt is discharged to the mold 70. Therefore, the molten salt S can be quantitatively solidified without regard to the opening/closing of the nozzle 62.

Hereinafter, the present invention will be described in more detail with reference to the following embodiment. It should be noted that the embodiment is merely exemplary and the present invention is not limited to this embodiment.

Embodiment

A 100 kg (67 l) molten salt of 650° C. LiCl-3 wt % Li2O was vacuum transferred in a molten state to the first vessel 10 through a transferring pipe (not shown) and the molten-salt inlet 16 where a temperature of 650° C. was maintained. The cylindrical stainless-steel mold 70 having the internal volume of 8 l was flange-connected with the sealing chamber 80 at the lower portion of the solidification apparatus 1 and was heated to 100-150° C. by the mold heater 72. Then, the first vessel 10, the second vessel 30 and the nozzle 30 were heated to 650° C. by the heater. Therefore, the salt S could be maintained in the molten state during the operations.

Then, the vacuum pump 56 of the molten-salt transferring unit 50 was driven and the second valve 56b of the pressure surge tank 54 was opened, such that the pressure surge tank 54 having the internal volume of 6.7 l was vacuumized to below $10^{-3}$ torr. Thereafter, the second valve 56b of the pressure surge tank 54 was closed and the first valve 52a disposed at the vacuum guide pipe 52 of the pressure surge tank 54 was opened, such that 6.7 l molten salt S was transferred from the first vessel 10 to the second vessel 30. At this time, the transfer of the molten salt S could be checked from the pressure gauge G connected to the pressure surge tank 54.

When the nozzle 62 was opened by ascending the stopper 64 through the operation of the pneumatic actuator 68, the 6.7 l molten salt S contained in the second vessel 30 was discharged through the nozzle 62 to the stainless-steel mold 70.

Meanwhile, during the process of discharging the molten salt S through the nozzle 62 to the mold 70, the inert gas was made to flow through the inert gas inlet 82a and the inert gas outlet 82b of the sealing chamber 80 in order to allow the molten salt to smoothly flow into the sealing chamber 80 and the mold 70.

When the process of discharging the molten salt S through the nozzle 62 was finished, the mold heater 72 stopped heating the mold 70. After the mold 70 and the molten salt S contained therein were cooled to below 50° C., the flange connection was released from the sealing chamber 80 and the mold 70 was separated from the solidification apparatus 1. Finally, when the solidified salt was taken out from the mold 70, the 10 kg cylindrical solidified salt Sa was obtained.

Then, the mold 70 was again flange-connected with the sealing chamber 80 at the lower portion of the solidification apparatus 1. The mold 70 was heated to 100-150° C. and a 6.7 l salt was vacuum transferred from the first vessel 10 to the second vessel 30 by using the pressure surge tank 54 of the molten-salt transferring unit 50. Then, the molten salt was discharged through the nozzle 62 to the mold 70. In this manner, a second solidified salt Sa was manufactured. By repeating these processes, ten 10 kg cylindrical solidified salts Sa were manufactured from the 67 l molten salt S that was transferred to the first vessel 10.

According to the present invention, bulky molten salt having strong corrosive property can be rapidly solidified in a proper size and shape easy to treat by using the vacuum transfer and the dual vessel. Therefore, the apparatus and the method according to the present invention can be usefully applied to the overall industries based on the molten salt.

In addition, since the molten salt is quantitatively transferred by the vacuum pressure, the molten salt can be solidified safely and rapidly.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An apparatus for quantitative solidification of a molten salt, the apparatus comprising:
   a first vessel into which the molten salt is introduced;
   a second vessel disposed inside the first vessel having a molten-salt transferring pipe for transferring the molten salt from the first vessel into the second vessel for supplying the molten salt;
   a lid covering the first vessel and the second vessel;
   a molten-salt transferring unit having a pressure surge tank connected to the second vessel by a vacuum guide pipe, and having a vacuum pump connected to one side of the pressure surge tank;
   a valve for controlling a discharge of the molten salt from the second vessel; and
   a mold for receiving the molten salt from the second vessel and solidifying the molten salt,
   wherein the molten salt quantitatively is transferred from the first vessel to the second vessel with an amount determined by vacuum pressure in the surge tank evacuated by the vacuum pump.

2. The apparatus of claim 1, wherein the first vessel, second vessel and the valve are capable of heating the molten salt to above a melting point by a first heater, a second heater and a mold heater.

3. The apparatus of claim 2, wherein the mold heater heats the mold in a range of 100-150° C. so as to prevent the molten salt from being rapidly cooled due to contact of the molten salt with the low-temperature mold, thereby preventing bounce of the molten salt.

4. The apparatus of claim 1, wherein the mold is formed in various shapes of sections and controls shapes of a solidified salt manufactured by the mold.

5. The apparatus of claim 1, wherein each of the first and second vessels includes an inert gas inlet and an inert gas outlet, such that a heating is performed in inert gas atmosphere and deliquescence of salt due to external air is prevented.

6. The apparatus of claim 1, wherein a lower end of the molten-salt transferring pipe is arranged close to a bottom of the first vessel, such that all the molten salt contained in the first vessel is transferred to the second vessel.

7. The apparatus of claim 1, wherein the valve includes:
   a nozzle for discharging the molten salt from the second vessel; and
   a stopper for opening/closing the nozzle though an ascending and descending operation caused by an actuator disposed above the stopper.

8. The apparatus of claim 7, wherein the nozzle extends downward from a center of a bottom of the second vessel to a center of a bottom of the first vessel, and has a molten-salt outlet at a lower portion thereof; and
   the stopper extends coaxially in the nozzle and a lower end of the stopper opens/closes the molten-salt outlet of the nozzle.

* * * * *